United States Patent
Dai et al.

(10) Patent No.: US 10,120,164 B2
(45) Date of Patent: Nov. 6, 2018

(54) IMAGING LENS ASSEMBLY

(71) Applicant: ZHEJIANG SUNNY OPTICS CO., LTD., Ningbo (CN)

(72) Inventors: Fujian Dai, Ningbo (CN); Lin Huang, Ningbo (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 0 days.

(21) Appl. No.: 15/035,707

(22) PCT Filed: Jan. 13, 2016

(86) PCT No.: PCT/CN2016/070804
§ 371 (c)(1),
(2) Date: May 10, 2016

(87) PCT Pub. No.: WO2016/197604
PCT Pub. Date: Dec. 15, 2016

(65) Prior Publication Data
US 2018/0081152 A1    Mar. 22, 2018

(30) Foreign Application Priority Data
Jun. 9, 2015 (CN) .......................... 2015 1 0313862

(51) Int. Cl.
*G02B 3/02* (2006.01)
*G02B 13/18* (2006.01)
(Continued)

(52) U.S. Cl.
CPC ........... *G02B 13/0045* (2013.01); *G02B 9/60* (2013.01)

(58) Field of Classification Search
CPC .... G02B 13/0045; G02B 13/18; G02B 13/04; G02B 9/60; G02B 3/04
(Continued)

(56) References Cited

U.S. PATENT DOCUMENTS

2010/0265593 A1* 10/2010 Tang .................. G02B 13/0045
                                                     359/663
2012/0105704 A1   5/2012 Huang et al.
2016/0320589 A1* 11/2016 Liao ........................ G02B 9/60

FOREIGN PATENT DOCUMENTS

CN      102466865 A    5/2012
CN      102583512 A    7/2012
(Continued)

OTHER PUBLICATIONS

PCT/CN2016/070804 English translation of the International Search Report, dated Apr. 1, 2016, 2 pages.
(Continued)

*Primary Examiner* — Collin X Beatty
(74) *Attorney, Agent, or Firm* — Lathrop Gage LLP

(57) ABSTRACT

Provided is an imaging lens assembly, including a first lens, a second lens, a third lens, a fourth lens and a fifth lens from an object side of the imaging lens assembly to an image side of the imaging lens assembly in turn. The first lens is of a positive focal power, an object side surface of the first lens is convex; the second lens is of a negative focal power, an image side surface of the second lens is concave; the third lens is of a focal power; the fourth lens is of a focal power; and the fifth lens is of a negative focal power; and a combined focal power of the third lens and the fourth lens is negative. The imaging lens assembly meets the following formulas: $2.0 < f/\text{ImgH} < 3.0$; and $0 < f1/f < 0.5$.

14 Claims, 8 Drawing Sheets

(51) Int. Cl.
*G02B 13/00* (2006.01)
*G02B 9/60* (2006.01)

(58) Field of Classification Search
USPC .......................... 359/714, 764, 740, 763, 708
See application file for complete search history.

(56) References Cited

FOREIGN PATENT DOCUMENTS

| | | |
|---|---|---|
| CN | 104635325 A | 5/2015 |
| JP | H10293246 A | 11/1998 |
| JP | 2013106589 A | 6/2013 |
| JP | 2014209163 A | 11/2014 |
| WO | WO 2013099255 A1 | 7/2013 |
| WO | WO 2015001440 A1 | 1/2015 |

OTHER PUBLICATIONS

Japanese Patent Application No. 2016528030 Notification of Reasons for Refusal dated Jul. 4, 2017, 7 pages.
Japanese Patent Application No. 2016528030 English translation of Notification of Reasons for Refusal dated Jul. 4, 2017, 6 pages.

* cited by examiner

IMAGING LENS ASSEMBLY

RELATED APPLICATIONS

The application is the U.S. national phase of PCT Application No. PCT/CN2016/070804 filed on Jan. 13, 2016, which claims a priority to and benefits of Chinese Patent Applications No. 201510313862.4, filed with the State Intellectual Property Office of P. R. China on Jun. 9, 2015, the entire contents of which are incorporated herein by reference.

FIELD

The present disclosure relates to an imaging technology, in particularly to an imaging lens assembly.

BACKGROUND

With the improvements in properties of charge-coupled device (CCD) and complementary metal-oxide semiconductor (CMOS) image sensors, as well as the reduction in size, it requires the corresponding imaging lens assembly to meet demands on high imaging quality and miniaturization.

In addition, most available portable electronic products are usually equipped with an imaging module, and there exists increasing higher requirements for people to an imaging lens assembly of the portable electronic product. Generally, the requirement to optical performance of the imaging lens assembly is satisfied by increasing the number of lenses, which results in an increased size of the imaging lens assembly, thus being against to the miniaturization of the imaging lens assembly. However, it is difficult for the available imaging lens assembly, commonly designed to have a wide angle characteristic for obtaining an image with a wider viewing angle, to obtain a sharply focused image when photographing an object at distance with magnification.

SUMMARY

The present disclosure seeks to solve at least one of the problems existing in the related art. Accordingly, the present disclosure provides in embodiments an imaging lens assembly.

The imaging lens assembly according to an embodiment of the present disclosure, includes a first lens, a second lens, a third lens, a fourth lens and a fifth lens from an object side of the imaging lens assembly to an image side of the imaging lens assembly in turn, wherein the first lens is of a positive focal power, an object side surface of the first lens is convex;

the second lens is of a negative focal power, an image side surface of the second lens is concave;

the third lens is of a focal power;

the fourth lens is of a focal power; and the fifth lens is of a negative focal power;

a combined focal power of the third lens and the fourth lens is negative;

the imaging lens assembly meets the following formulas:

$$2.0 < f/ImgH < 3.0; \text{ and}$$

$$0 < f1/f < 0.5,$$

wherein f represents an effective focal length of the imaging lens assembly,

ImgH equals to a half-length of a diagonal of an effective pixel region at an imaging side surface of the imaging lens assembly, and f1 represents an effective focal length of the first lens.

In some embodiments of the present disclosure, the imaging lens assembly further includes an aperture stop arranged between the first lens and the second lens.

In some embodiments of the present disclosure, the imaging lens assembly meets the following formula:

$$TTL/f \leq 1.0,$$

wherein TTL is a total length of the imaging lens assembly, and f represents an effective focal length of the imaging lens assembly.

In some embodiments of the present disclosure, the imaging lens assembly meets the following formula:

$$2.0 < f1/CT1 < 4.0,$$

wherein f1 represents an effective focal length of the first lens, and

CT1 is a central thickness of the first lens.

In some embodiments of the present disclosure, the imaging lens assembly meets the following formula:

$$-3.0 \leq f5/f \leq -1.0,$$

wherein f5 represents an effective focal length of the fifth lens, and f represents an effective focal length of the imaging lens assembly.

In some embodiments of the present disclosure, the imaging lens assembly meets the following formulas:

$$-1.5 < f3/f4 < 0; \text{ and}$$

$$0 < R6/R7 < 3.0,$$

wherein f3 represents an effective focal length of the third lens, f4 represents an effective focal length of the fourth lens, R6 represents a curvature radius of the image side surface of the third lens, and R7 represents a curvature radius of the object side surface of the fourth lens.

In some embodiments of the present disclosure, an image side surface of the first lens is convex, and an object side surface of the second lens is concave.

In some embodiments of the present disclosure, the third lens is of a positive focal power, and an image side surface of the third lens is convex.

In some embodiments of the present disclosure, the fourth lens is of a negative focal power, and an object side surface of the fourth lens is concave.

The imaging lens assembly meeting the above configurations may be guaranteed a telephoto characteristic, small depth of field and relative high magnification. Meanwhile, the above configurations may be helpful for shortening the total length of the imaging lens assembly, thus ensuring miniaturization of the imaging lens assembly. Such an imaging lens assembly, when used in combination with a wide-angle lens assembly, may have relative high magnification and resolution during auto-focusing.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
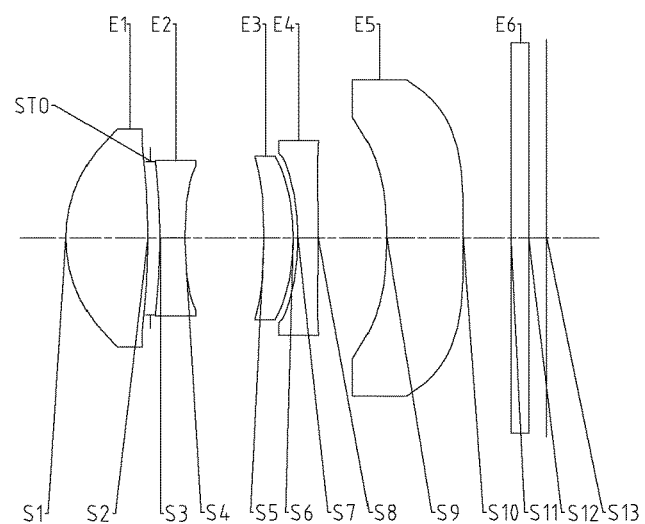
FIG. 1 is a schematic view showing the imaging lens assembly according to Example 1 of the present disclosure.
Figure 2:
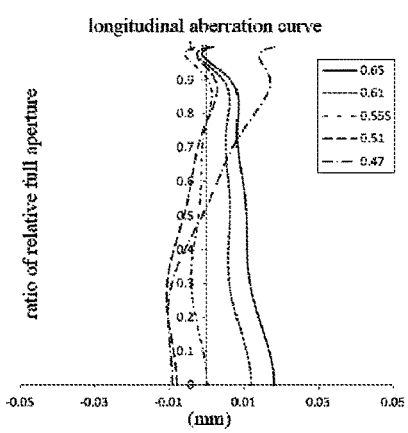
FIG. 2 is a diagram showing a longitudinal aberration curve (mm) of the imaging lens assembly in Example 1.
Figure 3:
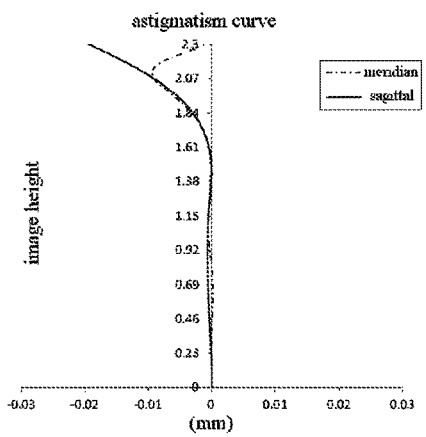
FIG. 3 is a diagram showing an astigmatism curve (mm) of the imaging lens assembly in Example 1.
Figure 4:
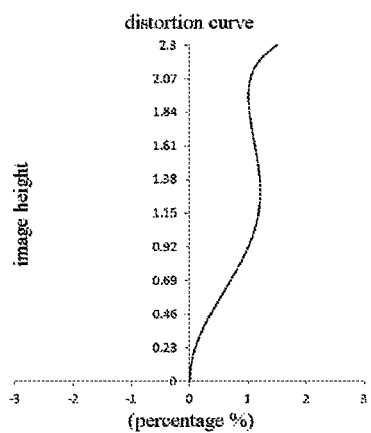
FIG. 4 is a diagram showing a distortion curve (%) of the imaging lens assembly in Example 1.
Figure 5:
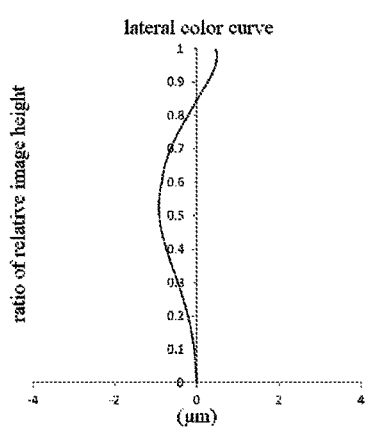
FIG. 5 is a diagram showing a lateral color curve (μm) of the imaging lens assembly in Example 1.
Figure 6:
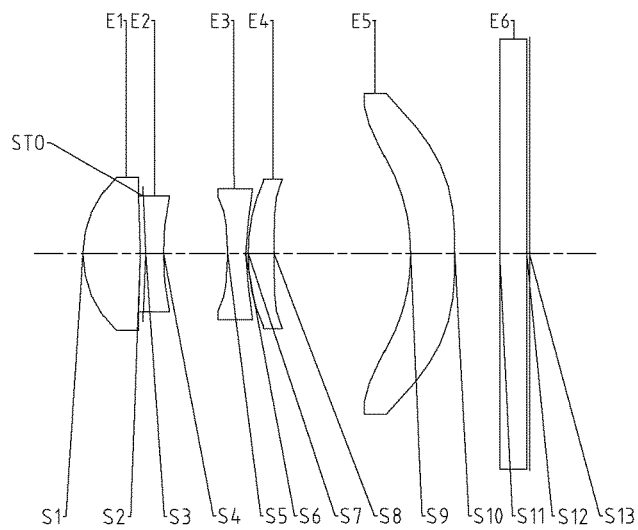
FIG. 6 is a schematic view showing the imaging lens assembly according to Example 2 of the present disclosure.
Figure 7:
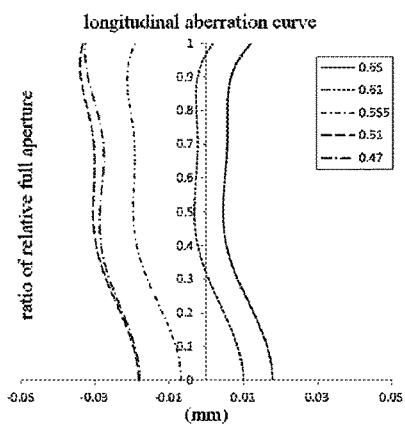
FIG. 7 is a diagram showing a longitudinal aberration curve (mm) of the imaging lens assembly in Example 2.
Figure 8:
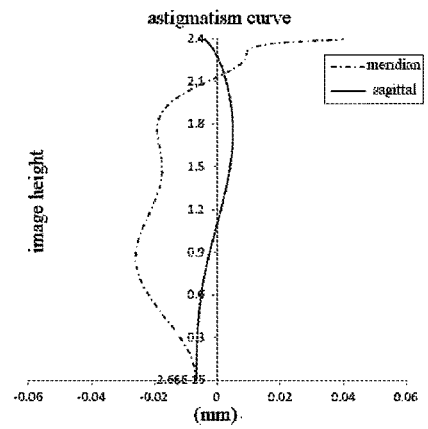
FIG. 8 is a diagram showing an astigmatism curve (mm) of the imaging lens assembly in Example 2.
Figure 9:
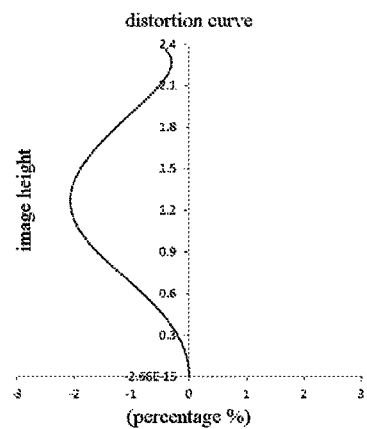
FIG. 9 is a diagram showing a distortion curve (%) of the imaging lens assembly in Example 2.
Figure 10:
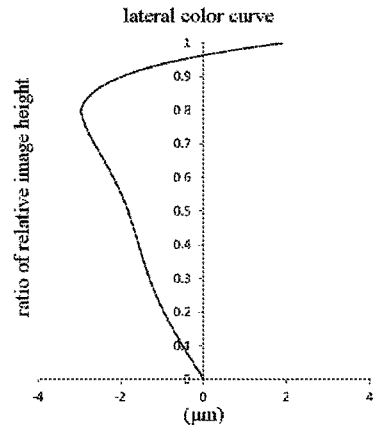
FIG. 10 is a diagram showing a lateral color curve (μm) of the imaging lens assembly in Example 2.
Figure 11:
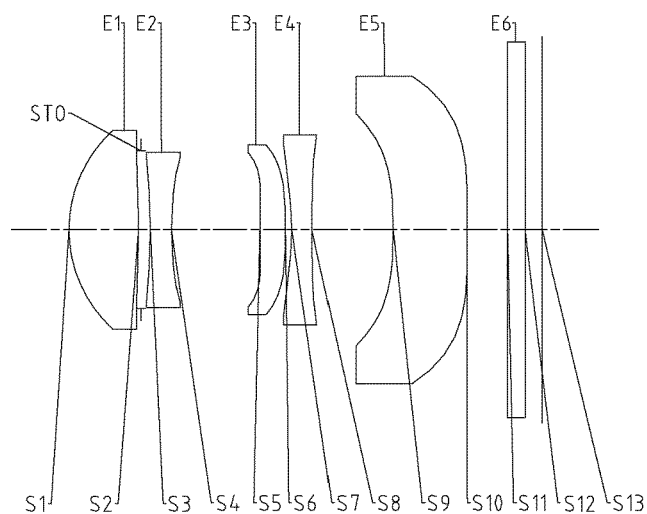
FIG. 11 is a schematic view showing the imaging lens assembly according to Example 3 of the present disclosure.
Figure 12:
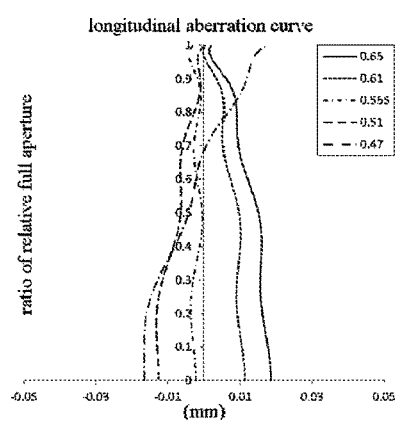
FIG. 12 is a diagram showing a longitudinal aberration curve (mm) of the imaging lens assembly in Example 3.
Figure 13:
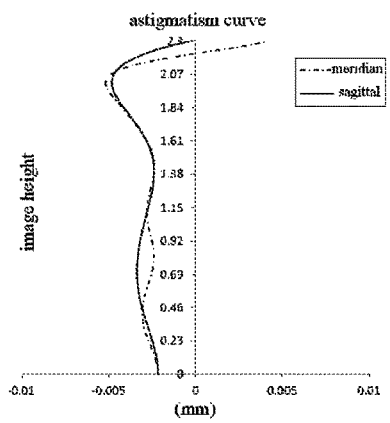
FIG. 13 is a diagram showing an astigmatism curve (mm) of the imaging lens assembly in Example 3.
Figure 14:
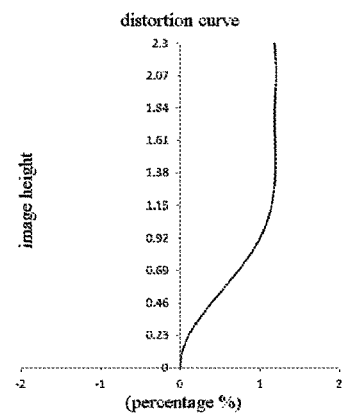
FIG. 14 is a diagram showing a distortion curve (%) of the imaging lens assembly in Example 3.
Figure 15:
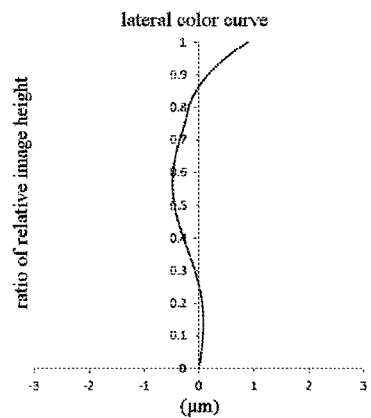
FIG. 15 is a diagram showing a lateral color curve (μm) of the imaging lens assembly in Example 3.
Figure 16:
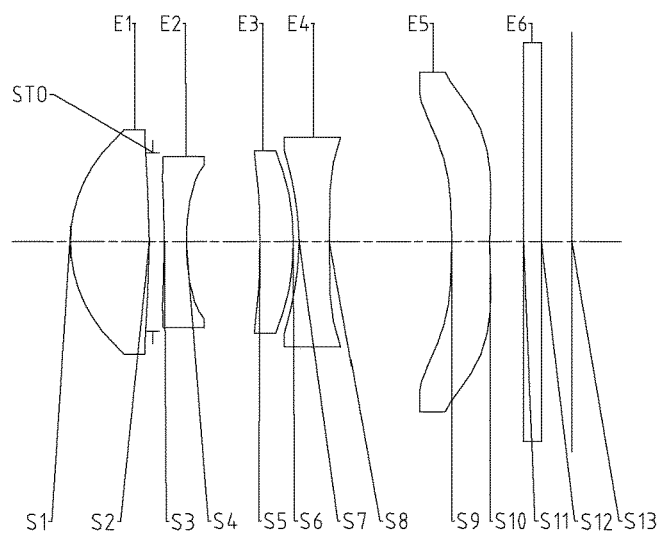
FIG. 16 is a schematic view showing the imaging lens assembly according to Example 4 of the present disclosure.
Figure 17:
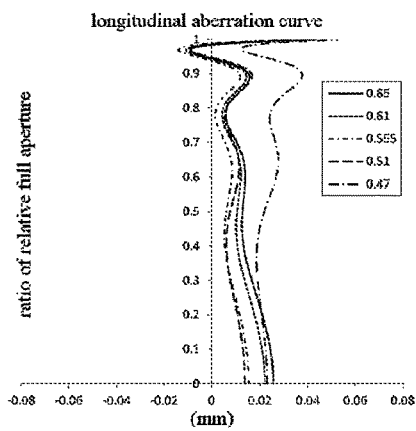
FIG. 17 is a diagram showing a longitudinal aberration curve (mm) of the imaging lens assembly in Example 4.
Figure 18:
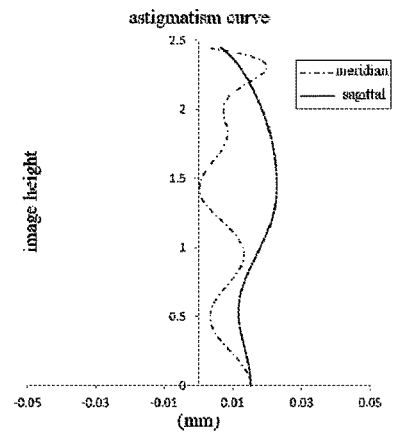
FIG. 18 is a diagram showing an astigmatism curve (mm) of the imaging lens assembly in Example 4.
Figure 19:
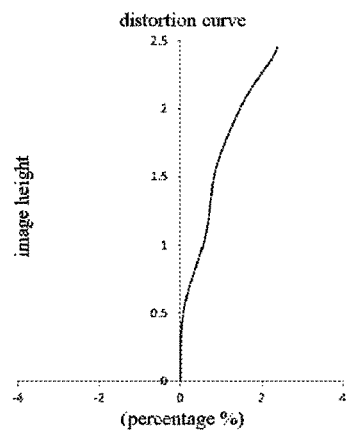
FIG. 19 is a diagram showing a distortion curve (%) of the imaging lens assembly in Example 4.
Figure 20:
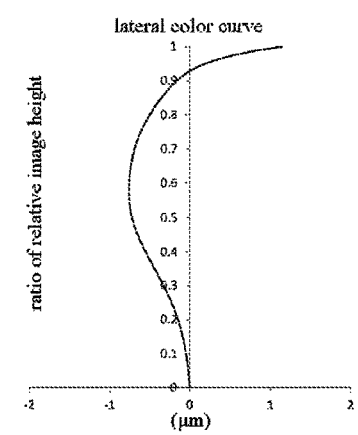
FIG. 20 is a diagram showing a lateral color curve (μm) of the imaging lens assembly in Example 4.
Figure 21:
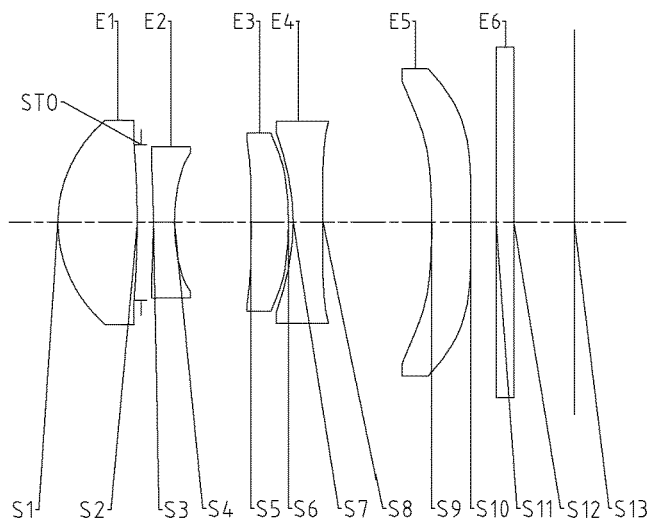
FIG. 21 is a schematic view showing the imaging lens assembly according to Example 5 of the present disclosure.
Figure 22:
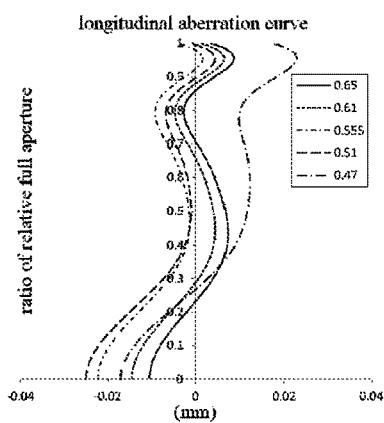
FIG. 22 is a diagram showing a longitudinal aberration curve (mm) of the imaging lens assembly in Example 5.
Figure 23:
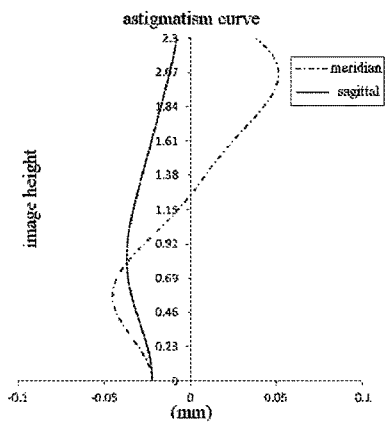
FIG. 23 is a diagram showing an astigmatism curve (mm) of the imaging lens assembly in Example 5.
Figure 24:
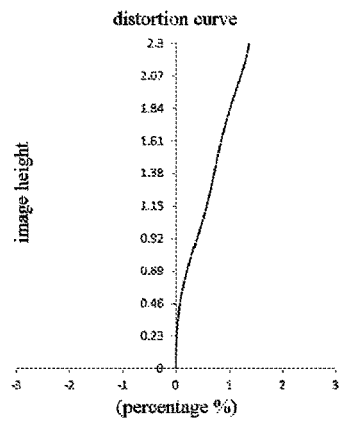
FIG. 24 is a diagram showing a distortion curve (%) of the imaging lens assembly in Example 5.
Figure 25:
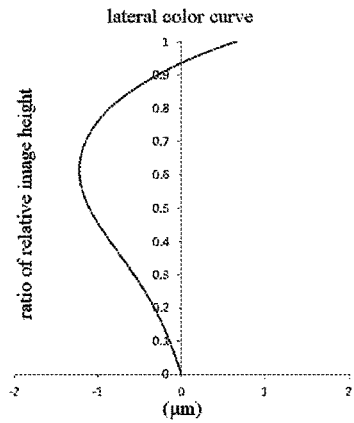
FIG. 25 is a diagram showing a lateral color curve (μm) of the imaging lens assembly in Example 5.
Figure 26:
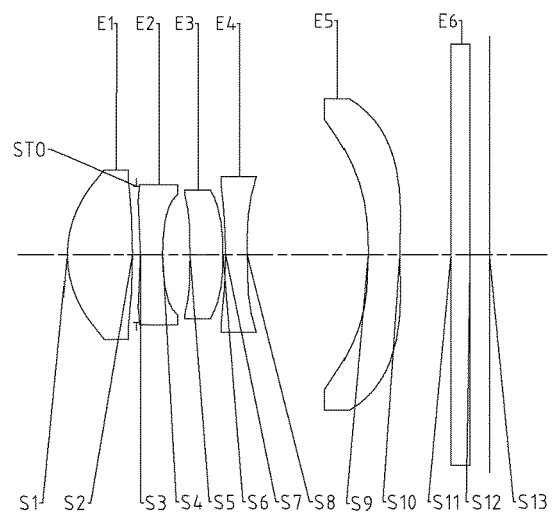
FIG. 26 is a schematic view showing the imaging lens assembly according to Example 6 of the present disclosure.
Figure 27:
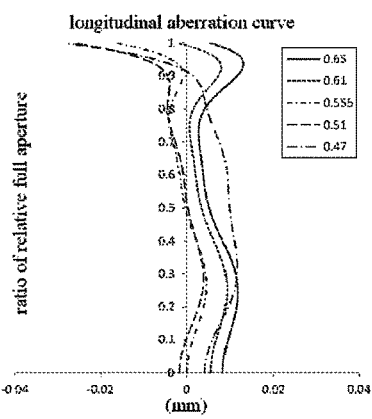
FIG. 27 is a diagram showing a longitudinal aberration curve (mm) of the imaging lens assembly in Example 6.
Figure 28:
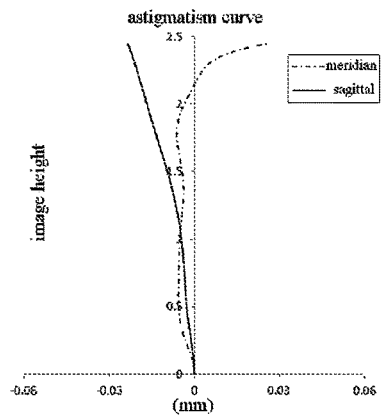
FIG. 28 is a diagram showing an astigmatism curve (mm) of the imaging lens assembly in Example 6.
Figure 29:
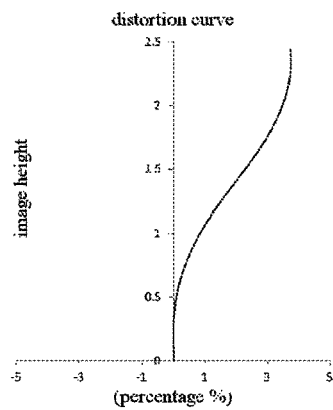
FIG. 29 is a diagram showing a distortion curve (%) of the imaging lens assembly in Example 6.
Figure 30:
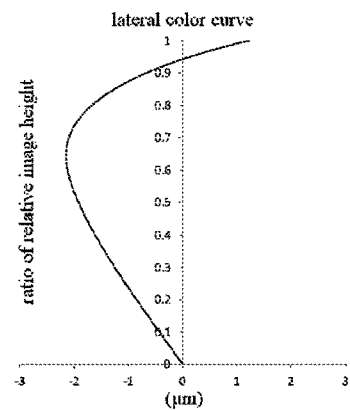
FIG. 30 is a diagram showing a lateral color curve (μm) of the imaging lens assembly in Example 6.
Figure 31:
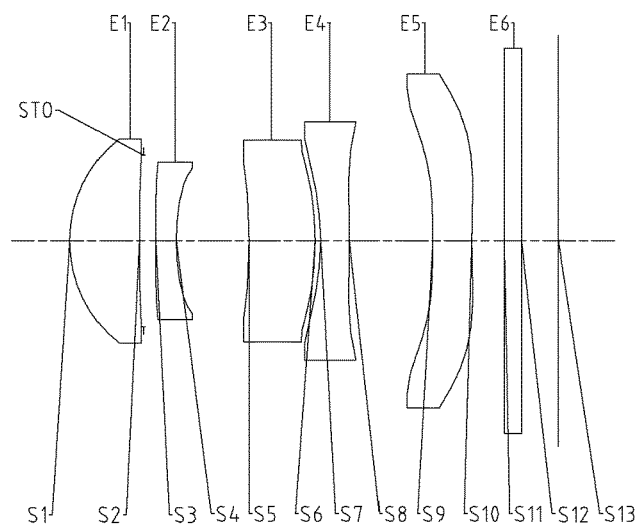
FIG. 31 is a schematic view showing the imaging lens assembly according to Example 7 of the present disclosure.
Figure 32:
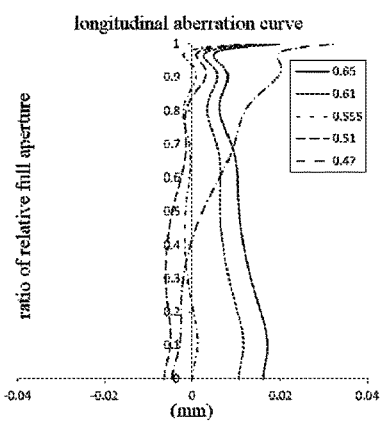
FIG. 32 is a diagram showing a longitudinal aberration curve (mm) of the imaging lens assembly in Example 7.
Figure 33:
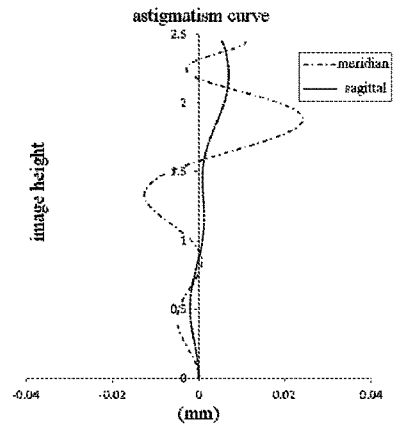
FIG. 33 is a diagram showing an astigmatism curve (mm) of the imaging lens assembly in Example 7.
Figure 34:
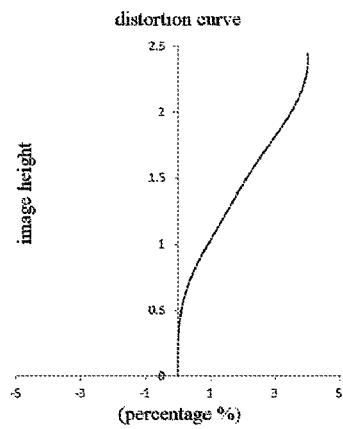
FIG. 34 is a diagram showing a distortion curve (%) of the imaging lens assembly in Example 7.
Figure 35:
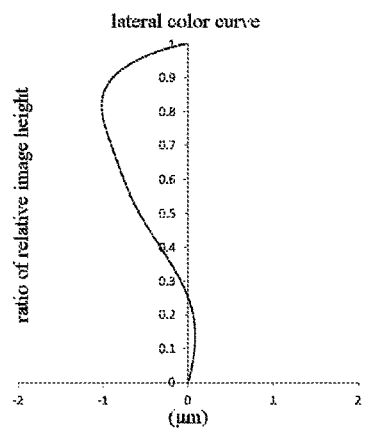
FIG. 35 is a diagram showing a lateral color curve (μm) of the imaging lens assembly in Example 7.
Figure 36:
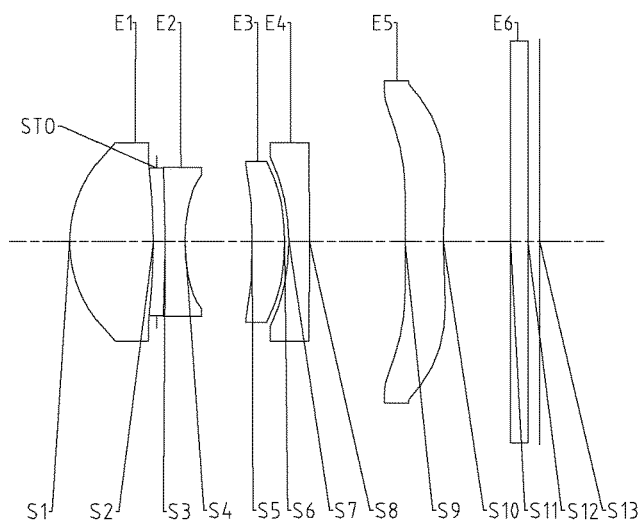
FIG. 36 is a schematic view showing the imaging lens assembly according to Example 8 of the present disclosure.
Figure 37:
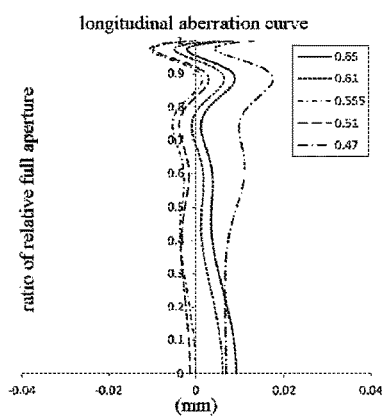
FIG. 37 is a diagram showing a longitudinal aberration curve (mm) of the imaging lens assembly in Example 8.
Figure 38:
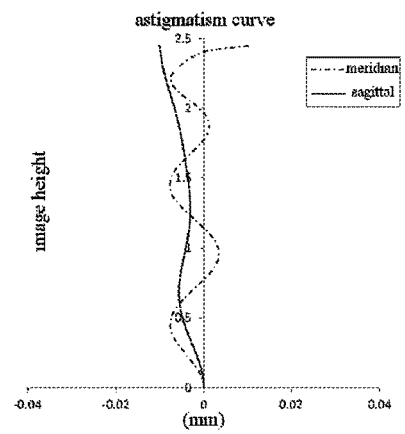
FIG. 38 is a diagram showing an astigmatism curve (mm) of the imaging lens assembly in Example 8.
Figure 39:
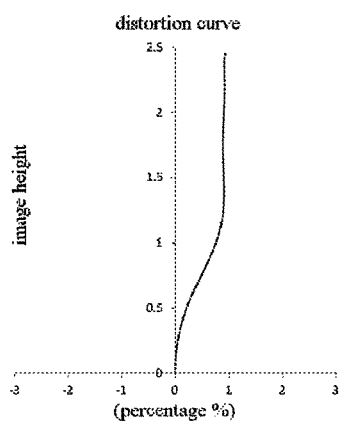
FIG. 39 is a diagram showing a distortion curve (%) of the imaging lens assembly in Example 8.
Figure 40:
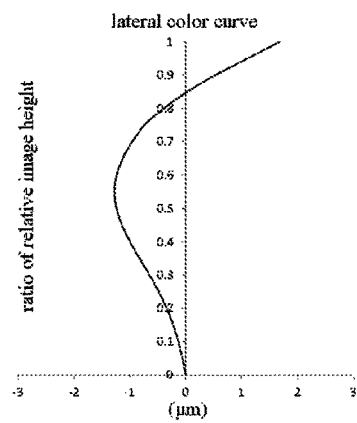
FIG. 40 is a diagram showing a lateral color curve (μm) of the imaging lens assembly in Example 8.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, unless specified otherwise, "a plurality of" means two or more than two.

In the description of the present disclosure, it should be noted that, unless otherwise clearly defined and limited, the terms "mounted," "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, in an embodiment of the present disclosure, an imaging lens assembly includes a first lens E1 being of a positive focal power, a second lens E2 being of a negative focal power, a third lens E3 being of a focal power, a fourth lens E4 being of a focal power and a fifth lens E5 being of a negative focal power.

Specifically, the first lens E1 includes an object side surface S1 and an image side surface S2. The second lens E2 includes an object side surface S3 and an image side surface S4. The third lens E3 includes an object side surface S5 and an image side surface S6. The fourth lens E4 includes an object side surface S7 and an image side surface S8. The fifth lens E5 includes an object side surface S9 and an image side surface S10. The object side surface S1 is convex, and the image side surface S4 is concave.

During imaging, light enters the imaging lens assembly from the object side at first, then emits from the image side of the imaging lens assembly after being refractive imaged through the imaging lens assembly, and finally is imaged at an imaging side surface S13 after passing through a light filter E6 including an object side surface S11 and an image side surface S12.

The imaging lens assembly meets the following formulas:

$2.0 < f/ImgH < 3.0$; and $0 < f1/f < 0.5$, in which f represents an effective focal length of the imaging lens assembly, ImgH equals to a half-length of a diagonal of an effective pixel region at an imaging side surface S13 of the imaging lens assembly, and f1 represents an effective focal length of the first lens E1.

The imaging lens assembly meeting the above configurations may be guaranteed a telephoto characteristic, small depth of field and relative high magnification. Meanwhile, the above configurations may be helpful for shortening the total length of the imaging lens assembly, thus ensuring miniaturization of the imaging lens assembly. Such an imaging lens assembly, when used in combination with a wide-angle lens assembly, may have relative high magnification and resolution during auto-focusing.

The imaging lens assembly further includes an aperture stop STO arranged between the first lens E1 and the second lens E2.

The imaging lens assembly meets the following formula:

$TTL/f \le 1.0$, in which TTL is a total length of the imaging lens assembly.

Meeting the requirement in such a formula contributes to balancing the telephoto characteristic and the miniaturization of the imaging lens assembly.

The imaging lens assembly meets the following formula:

$2.0 < f1/CT1 < 4.0$, in which CT1 is a thickness of the first lens E1 at its centre.

Meeting the requirement in such a formula contributes to reasonable distribution of focal powers in the imaging lens assembly, effective correction to various aberrations and improvement in the resolution of the imaging lens assembly.

The imaging lens assembly meets the following formula:

$-3.0 \le f5/f \le -1.0$, in which f5 represents an effective focal length of the fifth lens E5.

Meeting the requirement in such a formula contributes to guaranteeing the telephoto characteristic, allowing the imaging lens assembly to have a relative small field angle and a relative long focal length at the same time, as well as a relative high matching rat of chip.

The imaging lens assembly meets the following formulas:

$-1.5 < f3/f4 < 0$; and $0 < R6/R7 < 3.0$, in which f3 represents an effective focal length of the third lens E3, f4 represents an effective focal length of the fourth lens E4, R6 represents a curvature radius of the image side surface S6, and R7 represents a curvature radius of the object side surface S7.

Meeting the requirements in such two formulas contributes to the miniaturization of the imaging lens assembly and effectively improving the resolution of the imaging lens assembly.

The image side surface S2 is convex, and the object side surface S3 is concave.

The third lens E3 is of a positive focal power, and the image side surface S6 is convex.

The fourth lens E4 is of a negative focal power, and the object side surface S7 is concave.

The above requirements to the focal power and the shape of the individual lens are satisfied to further reduce the total length of the imaging lens assembly, so that the imaging lens assembly may have a compacted size. Meanwhile, the third lens E3 and the fourth lens E4 are arranged in appropriately, which may reduce sensibility to tolerance of the imaging lens assembly effectively.

In some embodiments, the first lens E1, the second lens E2, the third lens E3, the fourth lens E4 and the fifth lens E5 may all be aspheric shape lenses.

A surface shape of the aspheric shape is defined by a formula as below:

$$x = \frac{ch^2}{1+\sqrt{1-(k+1)c^2h^2}} + \sum A_i h^i$$

in which h is a height from any point on the aspheric shape to an optical axis, c is an apex curvature, k is a conic coefficient, Ai is a coefficient for the i-th order of the aspheric.

Example 1

In example 1, the imaging lens assembly meets the conditions in the following tables:

TABLE 1

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.5778 | 0.9656 | 1.54, 56.1 | −0.3593 |
| S2 | aspheric | −9.4201 | 0.0300 | | 23.8031 |
| STO | spherical | infinity | 0.1153 | | |
| S3 | aspheric | −6.3253 | 0.2891 | 1.64, 23.5 | 39.3661 |
| S4 | aspheric | 3.7848 | 0.9406 | | −33.3684 |
| S5 | aspheric | −7.2524 | 0.3446 | 1.64, 23.5 | −84.9134 |
| S6 | aspheric | −2.6059 | 0.0559 | | −2.0829 |
| S7 | aspheric | −2.6289 | 0.2400 | 1.54, 56.1 | −28.2494 |
| S8 | aspheric | −16.3347 | 0.8072 | | 99.9989 |
| S9 | aspheric | −4.1845 | 0.9034 | 1.54, 56.1 | −20.9603 |
| S10 | aspheric | −33.9550 | 0.5644 | | 46.2104 |
| S11 | spherical | infinity | 0.2100 | 1.52, 64.2 | |
| S12 | spherical | infinity | 0.1364 | | |
| S13 | spherical | infinity | | | |

TABLE 2

| Surface No. | A4 | A6 | A8 | A10 | A12 | A14 | A16 |
|---|---|---|---|---|---|---|---|
| S1 | 1.1133E−02 | −9.1921E−04 | 1.0459E−02 | −1.0122E−02 | 3.3048E−03 | 1.2412E−03 | −1.1810E−03 |
| S2 | −2.8913E−02 | 7.1463E−02 | −7.3838E−02 | 5.2215E−02 | −3.2302E−02 | 1.4269E−02 | −2.9144E−03 |
| S3 | −4.7660E−02 | 2.0641E−01 | −1.7614E−01 | 4.5183E−02 | 1.2096E−01 | −1.3973E−01 | 6.7465E−02 |
| S4 | 6.6894E−02 | 6.2359E−02 | 1.0350E−01 | −3.9151E−01 | 6.7407E−01 | −4.8813E−01 | 1.5098E−01 |
| S5 | −7.5734E−02 | −1.7558E−01 | 6.6530E−01 | −1.2308E+00 | 1.2349E+00 | −3.9545E−01 | −1.0943E−01 |
| S6 | 9.2927E−02 | −6.9824E−01 | 1.3489E+00 | −1.5402E+00 | 1.2795E+00 | −5.9205E−01 | 3.0919E−02 |
| S7 | 3.9656E−02 | −6.7069E−01 | 1.2629E+00 | −1.1227E+00 | 5.0128E−01 | 4.0312E−02 | −1.7783E−01 |
| S8 | 9.0175E−02 | −3.0863E−01 | 6.9270E−01 | −9.3327E−01 | 7.9834E−01 | −3.9451E−01 | 8.3944E−02 |
| S9 | −7.1707E−02 | −2.5851E−02 | 5.6040E−02 | −4.5438E−02 | 1.9702E−02 | −4.7965E−03 | 6.4282E−04 |
| S10 | −3.2211E−02 | −2.4180E−02 | 1.9889E−02 | −1.0262E−02 | 3.2558E−03 | −6.1075E−04 | 4.9305E−05 |

Furthermore, f1=2.55 mm; f2=−3.63 mm; f3=6.13 mm; f4=−5.77 mm; f5=−8.84 mm and f=6.06 mm; HFOV=20.5°; TTL=5.68 mm; Fno is: 2.63.

Example 2

In example 2, the imaging lens assembly meets the conditions in the following tables:

TABLE 3

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.1390 | 0.6320 | 1.54, 56.1 | −0.3068 |
| S2 | aspheric | −6.3458 | 0.0300 | | −48.3835 |
| STO | spherical | infinity | 0.0300 | | |
| S3 | aspheric | −3.7476 | 0.2000 | 1.64, 23.3 | −31.9157 |
| S4 | aspheric | 4.9142 | 0.7129 | | −58.3971 |
| S5 | aspheric | −4.1847 | 0.2000 | 1.74, 44.9 | 0.0000 |
| S6 | aspheric | 1.7339 | 0.0300 | | −10.7526 |
| S7 | aspheric | 2.0571 | 0.2875 | 1.64, 23.3 | 0.0000 |
| S8 | aspheric | −110.4299 | 1.5150 | | −0.0002 |
| S9 | aspheric | −2.4301 | 0.4922 | 1.54, 56.1 | −0.3803 |
| S10 | aspheric | −7.4558 | 0.5000 | | −6.2818 |
| S11 | spherical | infinity | 0.3000 | 1.52, 64.2 | |
| S12 | spherical | infinity | 0.0300 | | |
| S13 | spherical | infinity | | | |

TABLE 4

| Surface No. | A4 | A6 | A8 | A10 | A12 | A14 | A16 |
|---|---|---|---|---|---|---|---|
| S1 | 2.1841E−02 | 7.9372E−03 | 9.9168E−03 | 3.8145E−03 | 0 | 0 | 0 |
| S2 | 3.3956E−02 | 3.8717E−02 | −2.1216E−02 | 1.5821E−03 | 0 | 0 | 0 |
| S3 | 1.2408E−01 | −2.2426E−02 | 8.4235E−04 | 2.0995E−02 | 0 | 0 | 0 |
| S4 | 2.5303E−01 | −1.1178E−01 | 3.6187E−02 | 1.0276E−01 | 0 | 0 | 0 |

TABLE 4-continued

| Surface No. | A4 | A6 | A8 | A10 | A12 | A14 | A16 |
|---|---|---|---|---|---|---|---|
| S5 | −4.3743E−01 | 3.5561E−01 | −3.9903E−01 | −6.5392E−01 | 0 | 0 | 0 |
| S6 | −1.7297E−01 | 1.1238E−01 | −1.5889E−01 | 1.5000E−01 | 0 | 0 | 0 |
| S7 | −5.2491E−03 | −2.5197E−02 | 2.1547E−01 | −1.7042E−01 | 0 | 0 | 0 |
| S8 | 1.1347E−01 | 2.2358E−01 | −8.4559E−02 | −6.7892E−02 | 0 | 0 | 0 |
| S9 | −7.8832E−02 | 4.8186E−02 | −4.8067E−03 | −1.9855E−04 | 0 | 0 | 0 |
| S10 | −1.4631E−01 | 5.1686E−02 | −1.1482E−02 | 1.2819E−03 | 0 | 0 | 0 |

Furthermore, f1=1.82 mm; f2=−3.27 mm; f3=−1.62 mm; f4=3.14 mm; f5=−6.84 mm and f=6.49 mm; HFOV=20.3°; TTL=4.96 mm; Fno is: 4.0.

Example 3

In example 3, the imaging lens assembly meets the conditions in the following tables:

TABLE 5

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.5873 | 0.8361 | 1.54, 56.1 | −0.3338 |
| S2 | aspheric | −14.7828 | 0.0300 | | −100.0000 |
| STO | spherical | infinity | 0.1118 | | |
| S3 | aspheric | −7.6640 | 0.2534 | 1.64, 23.5 | 48.3971 |
| S4 | aspheric | 3.9937 | 1.0644 | | −48.6876 |
| S5 | aspheric | 7.6019 | 0.3060 | 1.64, 23.5 | −41.7534 |
| S6 | aspheric | −7.4497 | 0.0758 | | 32.5708 |
| S7 | aspheric | −2.7102 | 0.2400 | 1.54, 56.1 | −30.3428 |
| S8 | aspheric | 62.7532 | 0.9730 | | −99.9409 |
| S9 | aspheric | −5.9150 | 0.8894 | 1.54, 56.1 | −8.7731 |
| S10 | aspheric | −189.7707 | 0.4844 | | 46.2104 |
| S11 | spherical | infinity | 0.2100 | 1.52, 64.2 | |
| S12 | spherical | infinity | 0.2076 | | |
| S13 | spherical | infinity | | | |

TABLE 6

| Surface No. | A4 | A6 | A8 | A10 | A12 | A14 | A16 |
|---|---|---|---|---|---|---|---|
| S1 | 1.1225E−02 | 1.6558E−03 | 9.4999E−03 | −9.4671E−03 | 3.9635E−03 | 1.1822E−03 | −1.2047E−03 |
| S2 | −2.0278E−02 | 6.8305E−02 | −7.6622E−02 | 5.2327E−02 | −3.0432E−02 | 1.5231E−02 | −3.9067E−03 |
| S3 | −5.5093E−02 | 2.0505E−01 | −1.9175E−01 | 3.6162E−02 | 1.3195E−01 | −1.2802E−01 | 4.2721E−02 |
| S4 | 4.4541E−02 | 2.3135E−02 | 1.1371E−01 | −3.7603E−01 | 5.9458E−01 | −4.5631E−01 | 1.5098E−01 |
| S5 | −1.4148E−01 | −2.8639E−01 | 5.3841E−01 | −1.1108E+00 | 1.2023E+00 | −3.9545E−01 | −1.0943E−01 |
| S6 | 4.3236E−02 | −7.3979E−01 | 1.3601E+00 | −1.5481E+00 | 1.2427E+00 | −6.1655E−01 | 1.1745E−01 |
| S7 | 1.2355E−01 | −6.1948E−01 | 1.2618E+00 | −1.1382E+00 | 4.4940E−01 | −3.5113E−02 | −2.2379E−02 |
| S8 | 1.0372E−01 | −2.9789E−01 | 6.7055E−01 | −9.5194E−01 | 8.1013E−01 | −3.7262E−01 | 7.0510E−02 |
| S9 | −7.3339E−02 | −3.5514E−02 | 5.2421E−02 | −4.4522E−02 | 2.0518E−02 | −4.7744E−03 | 5.4684E−04 |
| S10 | −4.0084E−02 | −3.2465E−02 | 3.0579E−02 | −1.6091E−02 | 4.8954E−03 | −8.1165E−04 | 5.5324E−05 |

Furthermore, f1=2.67 mm; f2=−4.04 mm; f3=5.88 mm; f4=−4.75 mm; f5=−11.20 mm and f=6.08 mm; HFOV=20.5°; TTL=5.68 mm; Fno is: 2.6.

Example 4

In example 4, the imaging lens assembly meets the conditions in the following tables:

TABLE 7

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.6115 | 0.9295 | 1.54, 56.1 | −0.3873 |
| S2 | aspheric | −8.4928 | 0.0406 | | −0.1041 |
| STO | spherical | infinity | 0.1375 | | |

TABLE 7-continued

| Surface No. | Surface type | Curvature radius | Thickness | Material (refractive index/abbe) | Conic coefficient |
|---|---|---|---|---|---|
| S3 | aspheric | −8.4517 | 0.2591 | 1.65, 21.5 | 42.6768 |
| S4 | aspheric | 2.9242 | 0.8669 | | −18.8400 |
| S5 | aspheric | −49.9101 | 0.3938 | 1.65, 21.5 | −99.9900 |
| S6 | aspheric | −3.2865 | 0.0711 | | −1.9613 |
| S7 | aspheric | −2.2464 | 0.3540 | 1.54, 56.1 | −25.2482 |
| S8 | aspheric | −36.5351 | 1.4379 | | −99.9900 |
| S9 | aspheric | −13.5946 | 0.4481 | 1.54, 56.1 | 48.4669 |
| S10 | aspheric | 7.4176 | 0.3992 | | 9.6292 |
| S11 | spherical | infinity | 0.2100 | 1.52, 64.2 | |
| S12 | spherical | infinity | 0.3599 | | |
| S13 | spherical | infinity | | | |

TABLE 8

| Surface No. | A4 | A6 | A8 | A10 | A12 | A14 | A16 |
|---|---|---|---|---|---|---|---|
| S1 | 1.0935E−02 | 1.3583E−03 | 3.9726E−03 | −3.8508E−03 | 1.6203E−03 | 1.8718E−04 | −4.5027E−04 |
| S2 | 1.2203E−02 | 2.8393E−02 | −4.0778E−02 | 3.0047E−02 | −1.4668E−02 | 3.2415E−03 | −3.4259E−05 |
| S3 | −9.0869E−04 | 1.9574E−01 | −4.6835E−01 | 9.2715E−01 | −1.1833E+00 | 8.2138E−01 | −2.3125E−01 |
| S4 | 9.3164E−02 | 1.3014E−01 | −3.9313E−01 | 1.1757E+00 | −1.9376E+00 | 1.7149E+00 | −5.7957E−01 |
| S5 | −9.9883E−02 | 1.6855E−02 | 2.0354E−02 | 7.5407E−03 | −8.4448E−02 | 1.4377E−01 | −5.8151E−02 |
| S6 | 3.3795E−02 | −3.6982E−01 | 7.4311E−01 | −8.5368E−01 | 5.2774E−01 | −1.1664E−01 | −4.4246E−03 |
| S7 | 4.1800E−02 | −3.1060E−01 | 6.2538E−01 | −6.9570E−01 | 3.9204E−01 | −5.6248E−02 | −2.2489E−02 |
| S8 | 1.6788E−01 | −2.5408E−01 | 3.6042E−01 | −3.4502E−01 | 2.1178E−01 | −7.2430E−02 | 9.9372E−03 |
| S9 | −7.5687E−02 | −9.3129E−03 | 4.5435E−02 | −3.6727E−02 | 1.5190E−02 | −3.0623E−03 | 2.3977E−04 |
| S10 | −1.1136E−01 | 3.6496E−02 | −2.2587E−02 | 1.2804E−02 | −4.6475E−03 | 8.9292E−04 | −6.6758E−05 |

Furthermore, f1=2.56 mm; f2=−3.28 mm; f3=5.34 mm; f4=−4.40 mm; f5=−8.72 mm and f=6.74 mm; HFOV=19.6°; TTL=5.91 mm; Fno is: 2.8.

Example 5

In example 5, the imaging lens assembly meets the conditions in the following tables:

TABLE 9

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.5816 | 0.9387 | 1.54, 56.1 | −0.3982 |
| S2 | aspheric | −8.7955 | 0.0406 | | 7.9622 |
| STO | spherical | infinity | 0.1502 | | |
| S3 | aspheric | −7.9274 | 0.2500 | 1.64, 23.5 | 38.3770 |
| S4 | aspheric | 2.5250 | 0.9095 | | −10.5425 |
| S5 | aspheric | 19.9813 | 0.4431 | 1.64, 23.5 | −99.9900 |
| S6 | aspheric | −4.3609 | 0.0585 | | 2.7211 |
| S7 | aspheric | −2.1213 | 0.3540 | 1.54, 56.1 | −24.6290 |
| S8 | aspheric | −9.9782 | 1.2830 | | 57.7483 |
| S9 | aspheric | −12.2088 | 0.4661 | 1.54, 56.1 | 31.9044 |
| S10 | aspheric | 92.5018 | 0.3000 | | 99.9900 |
| S11 | spherical | infinity | 0.2100 | 1.52, 64.2 | |
| S12 | spherical | infinity | 0.7188 | | |
| S13 | spherical | infinity | | | |

TABLE 10

| Surface No. | A4 | A6 | A8 | A10 | A12 | A14 | A16 |
|---|---|---|---|---|---|---|---|
| S1 | 8.8860E−03 | 4.2798E−03 | 2.2994E−03 | −4.1365E−03 | 1.7638E−03 | 1.1492E−04 | −4.0592E−04 |
| S2 | 9.3759E−03 | 2.9207E−02 | −4.1119E−02 | 3.0171E−02 | −1.4452E−02 | 3.5410E−03 | −2.3953E−04 |
| S3 | 6.4407E−04 | 1.9414E−01 | −4.6592E−01 | 9.3101E−01 | −1.1825E+00 | 8.2101E−01 | −2.3299E−01 |
| S4 | 9.1810E−02 | 1.3498E−01 | −3.6737E−01 | 1.1649E+00 | −1.9202E+00 | 1.7149E+00 | −5.7957E−01 |
| S5 | −1.1791E−01 | 2.2632E−02 | 1.5693E−02 | 7.4587E−03 | −8.8090E−02 | 1.4392E−01 | −5.7966E−02 |
| S6 | 2.3397E−02 | −3.8318E−01 | 7.4397E−01 | −8.5145E−01 | 5.2741E−01 | −1.1858E−01 | −3.6814E−03 |
| S7 | 2.5001E−02 | −3.0718E−01 | 6.2072E−01 | −7.0223E−01 | 3.9301E−01 | −5.4107E−02 | −1.8405E−02 |
| S8 | 1.7582E−01 | −2.5561E−01 | 3.6161E−01 | −3.4651E−01 | 2.1053E−01 | −7.2252E−02 | 1.1107E−02 |

TABLE 10-continued

| Surface No. | A4 | A6 | A8 | A10 | A12 | A14 | A16 |
|---|---|---|---|---|---|---|---|
| S9 | −3.8274E−02 | −1.8667E−02 | 1.9789E−02 | −8.6267E−03 | 2.5625E−03 | −4.1623E−04 | 2.6552E−05 |
| S10 | −4.9604E−02 | −9.9064E−03 | 9.1721E−03 | −3.4639E−03 | 7.4840E−04 | −9.0156E−05 | 5.5428E−06 |

Furthermore, f1=2.54 mm; f2=−2.94 mm; f3=5.59 mm; f4=−5.01 mm; f5=−19.72 mm and f=6.74 mm; HFOV=18.5°; TTL=6.12 mm; Fno is: 2.8.

Example 6

In example 6, the imaging lens assembly meets the conditions in the following tables:

TABLE 11

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.2222 | 0.7160 | 1.54, 56.1 | −0.2492 |
| S2 | aspheric | −7.5741 | 0.0407 | | −17.1746 |
| STO | spherical | infinity | 0.0465 | | |
| S3 | aspheric | −3.7426 | 0.2436 | 1.64, 23.5 | −37.5099 |
| S4 | aspheric | 3.1630 | 0.3008 | | 4.6068 |
| S5 | aspheric | −13.4542 | 0.3630 | 1.64, 23.5 | −194.4062 |
| S6 | aspheric | −3.2828 | 0.0300 | | 15.3321 |
| S7 | aspheric | −3.6250 | 0.2364 | 1.54, 56.1 | −29.7108 |
| S8 | aspheric | 392.9519 | 1.3221 | | −16.3712 |
| S9 | aspheric | −6.7976 | 0.3469 | 1.54, 56.1 | 1.2761 |
| S10 | aspheric | 6.9564 | 0.5614 | | −250.8044 |
| S11 | spherical | infinity | 0.2100 | 1.52, 64.2 | |
| S12 | spherical | infinity | 0.2128 | | |
| S13 | spherical | infinity | | | |

TABLE 12

| Surface No. | A4 | A6 | A8 | A10 | A12 | A14 | A16 |
|---|---|---|---|---|---|---|---|
| S1 | 1.0204E−02 | −1.8084E−03 | −2.5169E−03 | −1.1229E−02 | −5.4588E−03 | −1.8856E−02 | −1.0701E−02 |
| S2 | −1.9186E−02 | 9.5127E−02 | −1.2991E−01 | 4.1485E−02 | −1.1564E−02 | 2.8741E−02 | −2.6093E−02 |
| S3 | 7.1485E−02 | 1.9485E−01 | −2.2473E−01 | 1.0552E−01 | 1.5941E−01 | −6.4055E−02 | −1.8828E−02 |
| S4 | 2.2907E−01 | −1.6428E−02 | 1.3331E+00 | −3.2953E+00 | 4.8237E+00 | −9.1326E−02 | 2.0156E+00 |
| S5 | −2.2992E−01 | 5.1879E−02 | −2.8252E−01 | 6.6241E−01 | 1.1281E+00 | −2.0786E+00 | −1.0094E+00 |
| S6 | −8.7497E−02 | −4.4003E−01 | 1.6150E+00 | −2.1710E+00 | 1.3887E+00 | −4.8614E−01 | −3.2812E−01 |
| S7 | 2.3260E−01 | −7.2424E−01 | 1.4967E+00 | −1.6083E+00 | 3.4629E−01 | 3.9133E−01 | −5.9058E−01 |
| S8 | 3.0331E−01 | −6.5892E−02 | −8.0389E−01 | 2.1192E+00 | −2.7328E+00 | 1.8197E+00 | −5.1293E−01 |
| S9 | −2.0304E−01 | 1.9286E−01 | −1.2592E−01 | 4.7775E−02 | −9.1247E−03 | 6.0838E−04 | 2.3787E−05 |
| S10 | −1.5138E−01 | 1.0213E−01 | −5.2332E−02 | 1.4883E−02 | −2.3051E−03 | 1.5070E−04 | −5.4138E−06 |

Furthermore, f1=1.98 mm; f2=−2.62 mm; f3=6.64 mm; f4=−6.58 mm; f5=−6.24 mm and f=5.04 mm; HFOV=25.1°; TTL=4.63 mm; Fno is: 2.55.

Example 7

In example 7, the imaging lens assembly meets the conditions in the following tables:

TABLE 13

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.5448 | 0.8461 | 1.54, 56.1 | −0.3335 |
| S2 | aspheric | 72.6555 | 0.0498 | | −4.7171E+04 |
| STO | spherical | infinity | 0.1495 | | |
| S3 | aspheric | 1292.2733 | 0.2500 | 1.65, 21.5 | −2.1609E+08 |
| S4 | aspheric | 3.0173 | 0.8900 | | −15.1958 |
| S5 | aspheric | −9.4588 | 0.8077 | 1.65, 21.5 | −203.2994 |
| S6 | aspheric | −3.5580 | 0.0678 | | −11.1351 |

TABLE 13-continued

| Surface No. | Surface type | Curvature radius | Thickness | Material (refractive index/abbe) | Conic coefficient |
|---|---|---|---|---|---|
| S7 | aspheric | −2.3890 | 0.3498 | 1.54, 56.1 | −26.8346 |
| S8 | aspheric | −8.6110 | 1.0153 | | 31.9146 |
| S9 | aspheric | −13.8967 | 0.4730 | 1.54, 56.1 | 47.8697 |
| S10 | aspheric | 8.6283 | 0.3992 | | 10.8837 |
| S11 | spherical | infinity | 0.2100 | 1.52, 64.2 | |
| S12 | spherical | infinity | 0.4515 | | |
| S13 | spherical | infinity | | | |

TABLE 14

| Surface No. | A4 | A6 | A8 | A10 | A12 | A14 | A16 |
|---|---|---|---|---|---|---|---|
| S1 | 1.2065E−02 | 4.7917E−03 | 5.0374E−03 | −3.8558E−03 | 1.7680E−03 | 4.6401E−04 | −2.7601E−04 |
| S2 | 8.0749E−03 | 2.7715E−02 | −3.9114E−02 | 3.0999E−02 | −1.4276E−02 | 3.1560E−03 | −1.9869E−04 |
| S3 | −1.6417E−02 | 1.8838E−01 | −4.7083E−01 | 9.2814E−01 | −1.1786E+00 | 8.2481E−01 | −2.3879E−01 |
| S4 | 9.3194E−02 | 1.3705E−01 | −3.8163E−01 | 1.1725E+00 | −1.9338E+00 | 1.6932E+00 | −5.2930E−01 |
| S5 | −8.3024E−02 | 2.8922E−02 | 2.2781E−02 | −2.1103E−01 | −7.9949E−02 | 1.2721E−01 | −5.1170E−02 |
| S6 | 5.2601E−02 | −3.6326E−01 | 7.5086E−01 | −8.7013E−01 | 5.2673E−01 | −1.2124E−01 | −5.8099E−04 |
| S7 | 4.9067E−02 | −3.0882E−01 | 6.2095E−01 | −6.9852E−01 | 3.8136E−01 | −5.0714E−02 | −1.6366E−02 |
| S8 | 1.6231E−01 | −2.5053E−01 | 3.5854E−01 | −3.4583E−01 | 2.0774E−01 | −6.7341E−02 | 8.8395E−03 |
| S9 | −5.5209E−02 | −7.8739E−03 | 2.5336E−02 | −1.6442E−02 | 6.0565E−03 | −1.1146E−03 | 7.7893E−05 |
| S10 | −8.9352E−02 | 3.6800E−02 | −2.2457E−02 | 1.0914E−02 | −3.3233E−03 | 5.4454E−04 | −3.5919E−05 |

Furthermore, f1=2.88 mm; f2=−4.61 mm; f3=8.24 mm; f4=−6.18 mm; f5=−9.68 mm and f=6.46 mm; HFOV=20.0°; TTL=5.96 mm; Fno is: 2.8.

Example 8

In example 8, the imaging lens assembly meets the conditions in the following tables:

TABLE 15

| Surface No. | Surface type | Curvature radius | Thickness | Material (refractive index/abbe) | Conic coefficient |
|---|---|---|---|---|---|
| OBJ | spherical | infinity | infinity | | |
| S1 | aspheric | 1.5214 | 1.0114 | 1.54, 56.1 | −0.4236 |
| S2 | aspheric | −6.2206 | 0.0369 | | −1.1121 |
| STO | spherical | infinity | 0.1070 | | |
| S3 | aspheric | −6.9809 | 0.2396 | 1.64, 23.5 | 46.6397 |
| S4 | aspheric | 2.2899 | 0.8158 | | −13.1682 |
| S5 | aspheric | −22.8673 | 0.3946 | 1.64, 23.5 | −79.3058 |
| S6 | aspheric | −2.9618 | 0.0540 | | −0.8715 |
| S7 | aspheric | −1.9916 | 0.2500 | 1.54, 56.1 | −22.8867 |
| S8 | aspheric | −7.7230 | 1.1531 | | 37.3210 |
| S9 | aspheric | 19.5870 | 0.4655 | 1.54, 56.1 | 50.0000 |
| S10 | aspheric | 6.4907 | 0.8174 | | 9.9580 |
| S11 | spherical | infinity | 0.2100 | 1.52, 64.2 | |
| S12 | spherical | infinity | 0.1447 | | |
| S13 | spherical | infinity | | | |

TABLE 16

| Surface No. | A4 | A6 | A8 | A10 | A12 | A14 | A16 |
|---|---|---|---|---|---|---|---|
| S1 | 1.2767E−02 | −2.3653E−04 | 7.9518E−03 | −9.5931E−03 | 3.9743E−03 | 4.6827E−04 | −1.0696E−03 |
| S2 | 1.6509E−02 | 4.1558E−02 | −8.0037E−02 | 7.2043E−02 | −4.0839E−02 | 1.1523E−02 | −9.8256E−04 |
| S3 | −1.8540E−03 | 3.1971E−01 | −9.1234E−01 | 2.1888E+00 | −3.3685E+00 | 2.8460E+00 | −9.7708E−01 |
| S4 | 1.2686E−01 | 1.9752E−01 | −7.5622E−01 | 2.7975E+00 | −5.5681E+00 | 5.9202E+00 | −2.4210E+00 |
| S5 | −1.3817E−01 | 2.0778E−02 | 3.7619E−02 | 1.8737E−02 | −2.4176E−01 | 4.9324E−01 | −2.4214E−01 |
| S6 | 3.9543E−02 | −6.0526E−01 | 1.4393E+00 | −2.0188E+00 | 1.5047E+00 | −4.0127E−01 | −1.5379E−02 |
| S7 | 3.3104E−02 | −5.1418E−01 | 1.2056E+00 | −1.6499E+00 | 1.1188E+00 | −1.9034E−01 | −7.6883E−02 |
| S8 | 2.0573E−01 | −4.1920E−01 | 7.0106E−01 | −8.1395E−01 | 6.0230E−01 | −2.4965E−01 | 4.4588E−02 |
| S9 | −5.2572E−02 | −2.8595E−02 | 3.7965E−02 | −2.0784E−02 | 7.1057E−03 | −1.4328E−03 | 1.2890E−04 |
| S10 | −6.8106E−02 | −1.5314E−02 | 1.7615E−02 | −8.2337E−03 | 2.1632E−03 | −3.1129E−04 | 1.7622E−05 |

Furthermore, f1=2.35 mm; f2=−2.65 mm; f3=5.24 mm; f4=−4.99 mm; f5=−18.01 mm and f=6.14 mm; HFOV=21.6°; TTL=5.70 mm; Fno is: 2.58.

In examples 1 to 8, formulas meet the conditions in the following tables:

| Formula | Example | | | | | | | |
|---|---|---|---|---|---|---|---|---|
|  | 1 | 2 | 3 | 4 | 5 | 6 | 7 | 8 |
| f/ImgH | 2.68 | 2.71 | 2.64 | 2.75 | 2.93 | 2.06 | 2.64 | 2.51 |
| f1/f | 0.42 | 0.28 | 0.44 | 0.38 | 0.38 | 0.39 | 0.45 | 0.38 |
| TTL/f | 0.94 | 0.76 | 0.93 | 0.88 | 0.91 | 0.92 | 0.92 | 0.93 |
| f1/CT1 | 2.65 | 2.88 | 3.20 | 2.76 | 2.70 | 2.77 | 3.40 | 2.32 |
| f5/f | −1.46 | −1.05 | −1.84 | −1.29 | −2.93 | −1.24 | −1.50 | −2.93 |
| f3/f4 | −1.06 | −0.52 | −1.24 | −1.21 | −1.12 | −1.01 | −1.33 | −1.05 |
| R6/R7 | 0.99 | 0.84 | 2.75 | 1.46 | 2.06 | 0.91 | 1.49 | 1.49 |
| f34 | −79.47 | −3.49 | −29.24 | −26.05 | −9.99 | −417.43 | −21.55 | −92.19 |

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. An imaging lens assembly, comprising a first lens, a second lens, a third lens, a fourth lens and a fifth lens from an object side of the imaging lens assembly to an image side of the imaging lens assembly in turn, wherein
   the first lens is of a positive focal power, an object side surface of the first lens is convex;
   the second lens is of a negative focal power, an image side surface of the second lens is concave;
   the third lens is of a focal power;
   the fourth lens is of a focal power; and
   the fifth lens is of a negative focal power;
   a combined focal power of the third lens and the fourth lens is negative;
   the imaging lens assembly meets the following formulas:

$2.0 < f/\text{ImgH} < 3.0$; and $0 < f1/f < 0.5$, wherein f represents an effective focal length of the imaging lens assembly,
   ImgH equals to a half-length of a diagonal of an effective pixel region at an imaging side surface of the imaging lens assembly, and
   f1 represents an effective focal length of the first lens.

2. The imaging lens assembly according to claim 1, further comprising an aperture stop arranged between the first lens and the second lens.

3. The imaging lens assembly according to claim 1, wherein the imaging lens assembly meets the following formula:

$\text{TTL}/f \leq 1.0$, wherein TTL is a total length of the imaging lens assembly, and
   f represents an effective focal length of the imaging lens assembly.

4. The imaging lens assembly according to claim 1, wherein the imaging lens assembly meets the following formula:

$2.0 < f1/CT1 < 4.0$, wherein f1 represents an effective focal length of the first lens, and
   CT1 is a central thickness of the first lens.

5. The imaging lens assembly according to claim 1, wherein the imaging lens assembly meets the following formula:

$-3.0 \leq f5/f \leq -1.0$, wherein f5 represents an effective focal length of the fifth lens, and
   f represents an effective focal length of the imaging lens assembly.

6. The imaging lens assembly according to claim 1, wherein the imaging lens assembly meets the following formulas:

$-1.5 < f3/f4 < 0$; and $0 < R6/R7 < 3.0$, wherein f3 represents an effective focal length of the third lens,
   f4 represents an effective focal length of the fourth lens,
   R6 represents a curvature radius of the image side surface of the third lens, and
   R7 represents a curvature radius of the object side surface of the fourth lens.

7. The imaging lens assembly according to claim 1, wherein an image side surface of the first lens is convex, and an object side surface of the second lens is concave.

8. The imaging lens assembly according to claim 7, wherein the third lens is of a positive focal power, and an image side surface of the third lens is convex.

9. The imaging lens assembly according to claim 8, wherein the fourth lens is of a negative focal power, and an object side surface of the fourth lens is concave.

10. The imaging lens assembly according to claim 2, wherein an image side surface of the first lens is convex, and an object side surface of the second lens is concave.

11. The imaging lens assembly according to claim 3, wherein an image side surface of the first lens is convex, and an object side surface of the second lens is concave.

12. The imaging lens assembly according to claim 4, wherein an image side surface of the first lens is convex, and an object side surface of the second lens is concave.

13. The imaging lens assembly according to claim 5, wherein an image side surface of the first lens is convex, and an object side surface of the second lens is concave.

14. The imaging lens assembly according to claim 6, wherein an image side surface of the first lens is convex, and an object side surface of the second lens is concave.

\* \* \* \* \*